United States Patent
Shigemura

(10) Patent No.: US 8,897,969 B2
(45) Date of Patent: Nov. 25, 2014

(54) COLLISION SAFETY CONTROL APPARATUS AND METHOD FOR VEHICLE

(71) Applicant: Denso Corporation, Kariya-city, Aichi-pref. (JP)

(72) Inventor: Shusaku Shigemura, Kariya (JP)

(73) Assignee: Denso Corporation, Kariya (JP)

( * ) Notice: Subject to any disclaimer, the term of this patent is extended or adjusted under 35 U.S.C. 154(b) by 207 days.

(21) Appl. No.: 13/737,185

(22) Filed: Jan. 9, 2013

(65) Prior Publication Data

US 2013/0184939 A1    Jul. 18, 2013

(30) Foreign Application Priority Data

Jan. 12, 2012   (JP) ................. 2012-004168

(51) Int. Cl.

| | |
|---|---|
| *B60R 22/00* | (2006.01) |
| *E05F 15/00* | (2006.01) |
| *G05D 1/00* | (2006.01) |
| *G06F 7/00* | (2006.01) |
| *B60R 21/0136* | (2006.01) |
| *B60R 21/015* | (2006.01) |

(52) U.S. Cl.
CPC ........... *B60R 21/0136* (2013.01); *B60R 21/015* (2013.01); *B60R 2021/01541* (2013.01)
USPC ...................... 701/45; 701/1; 701/36; 701/28

(58) Field of Classification Search
CPC ........... B60R 2021/01508; B60R 2021/01541; B60R 2021/01566; B60R 2021/0027
USPC ....................... 701/1, 28, 36, 45–47
See application file for complete search history.

(56) References Cited

U.S. PATENT DOCUMENTS

| | | |
|---|---|---|
| 2004/0021305 A1 | 2/2004 | Takagi et al. |
| 2005/0263992 A1 | 12/2005 | Matsuda |

FOREIGN PATENT DOCUMENTS

| | | |
|---|---|---|
| JP | 2004-053324 | 2/2004 |
| JP | 2004-274154 | 9/2004 |
| JP | 2006-205844 | 8/2006 |
| JP | 2010-100142 | 5/2010 |
| JP | 2012-001125 | 1/2012 |

OTHER PUBLICATIONS

Office action dated Nov. 26, 2013 in Japanese Application No. 2012-004168.
Office action dated Feb. 3, 2014 in corresponding Korean Application No. 10-2012-0153006.

*Primary Examiner* — Bhavesh V Amin
(74) *Attorney, Agent, or Firm* — Harness, Dickey & Pierce, PLC

(57) ABSTRACT

A vehicular collision safety control apparatus is disclosed. The apparatus includes an image acquirer for acquiring an image of a face of an occupant of the vehicle, a face position acquirer for acquiring a position of the face in a three-dimensional space based on the image, a distance calculator for calculating a distance between the acquired position of the face and a reference position located in front of the face, an airbag activator for increasing airbag pressure to a predetermined pressure in response to impact detection, and a setting device for setting a waiting time from the impact detection to start of airbag inflation, so that as the calculated distance is smaller, a pressure-reach time for the airbag pressure to reach the predetermined pressure is smaller.

6 Claims, 4 Drawing Sheets

FIG. 5
| TIME SPAN | FRAME NUMBER | FACE CENTER |
|---|---|---|
| $t_0 - t_0 + \Delta t$ | $F_1, F_2 \cdots F_N$ | $C_1$ |
| $t_0 + \Delta t - t_0 + 2\Delta t$ | $F_{N+1}, F_{N+2} \cdots F_{2N}$ | $C_2$ |
| $t_0 + 2\Delta t - t_0 + 3\Delta t$ | $F_{2N+1}, F_{2N+2} \cdots F_{3N}$ | $C_3$ |
FIG. 6
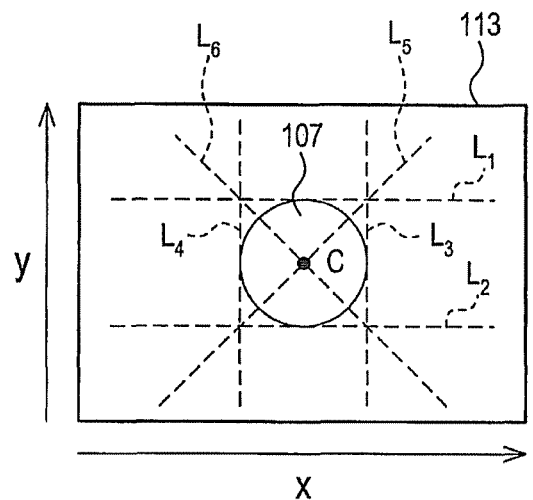
FIG. 7
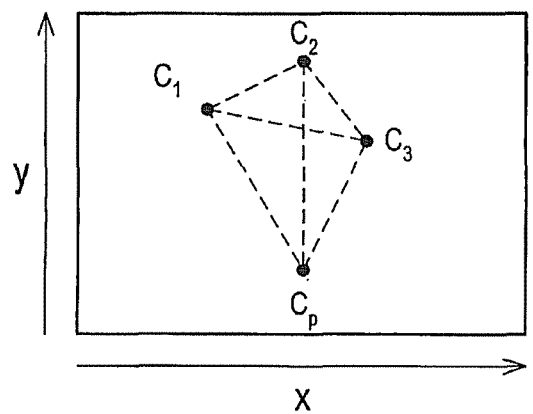

COLLISION SAFETY CONTROL APPARATUS AND METHOD FOR VEHICLE

CROSS REFERENCE TO RELATED APPLICATION

The present application is based on Japanese Patent Application No. 2012-4168 filed on Jan. 12, 2012, disclosure of which is incorporated herein by reference.

TECHNICAL FIELD

The present disclosure relates to a collision safety apparatus and method for a vehicle.

BACKGROUND

Conventionally, an airbag is provided to improve safety in vehicle collision. As to the airbag, a technique for changing airbag control at vehicle collision according to occupant type such as adult and child has been proposed (see Patent Document 1).

Patent Document 1: JP 2004-53324A (corresponding to US 2004/0021305A)

The inventor of the present application has found that there is the following difficulty in typical airbag control. In the typical airbag control, after detection of impact on the vehicle, pressure inside the airbag increases with time and reaches its maximum pressure after a while, and thereafter decreases with time. In the above, if a distance "d" between the driver's face and the steering wheel is small, the driver's face may collide with the steering wheel before the airbag is sufficiently inflated. Additionally, if the distance "d" is large, the pressure of the airbag has already decreased below the maximum pressure at a time when the driver's face collides with the steering wheel.

SUMMARY

In view of the foregoing, it is an object of the present disclosure to provide a collision safety control apparatus and method for a vehicle that can solve the above-described difficulty.

According to one example, a collision safety control apparatus for a vehicle includes an image acquisition device, a face position acquisition device, a distance calculation device, an airbag activation device and a setting device. The image acquisition device acquires an image in which a face of an occupant of the vehicle is photographed. The face position acquisition device acquires a position of the face of the occupant in a three-dimensional space based on the acquired image. The distance calculation device calculates a distance (d) between the acquired position of the face of the occupant in the three-dimensional space and a reference position located in front of the face of the occupant. The airbag activation device increases pressure inside an airbag to a predetermined pressure in response to detection of an impact on the vehicle. The setting device sets a waiting time (W) from the detection of the impact to start of inflation of the airbag in accordance with the calculated distance (d), so that as the calculated distance (d) is smaller, a pressure-reach time (T) is smaller, wherein the pressure-reach time (T) is a time from when the impact is detected to when the pressure inside the airbag reaches the predetermined pressure.

According to another example, a collision safety control method for a vehicle includes: acquiring an image in which a face of an occupant of the vehicle is photographed; acquiring a position of the face of the occupant in a three-dimensional space based on the acquired image; calculating a distance (d) between the acquired position of the face of the occupant in the three-dimensional space and a reference position located in front of the face of the occupant; and setting a waiting time (W) from detection of an impact on the vehicle to start of inflation of an airbag in accordance with the calculated distance (d), so that as the calculated distance (d) is smaller, a pressure-reach time (T) is smaller, wherein the pressure-reach time (T) is a time from when the impact is detected to when pressure inside the airbag reaches a predetermined pressure.

According to the above collision safety control apparatus and method, the smaller the distance (d) is, the smaller pressure-reach time (T) is set. Therefore, for example, even if the distance (d) is small, the collision of the occupant's face with a steering wheel before the inflation of the airbag can be prevented. Furthermore, since the larger pressure-reach time (T) is set when the distance (d) is large, the decrease in the pressure inside the airbag below a supposed pressure when the occupant's face collides with the steering wheel can be prevented.

BRIEF DESCRIPTION OF THE DRAWINGS

The above and other objects, features and advantages of the present disclosure will become more apparent from the following detailed description made with reference to the accompanying drawings. In the drawings:

FIG. 5 is a diagram illustrating a relation between a time span during which the camera takes images and frame numbers of the images;

FIG. 6 is a diagram illustrating how to calculate a face center position in the image;

FIG. 7 is a diagram illustrating how to determine whether or not there is a change in position of the face.

DETAILED DESCRIPTION

Embodiments will be described.

1. Configuration of Vehicular Collision Safety Control Apparatus 1

Figure 1:
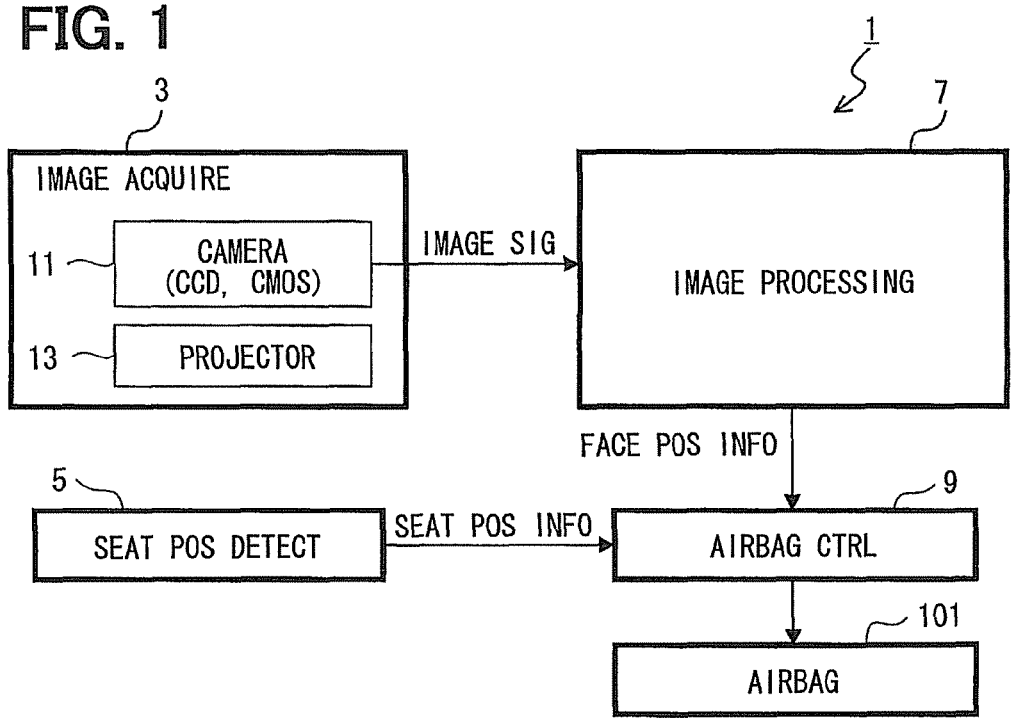
FIG. 1 is a block diagram illustrating a configuration of a vehicular collision safety control apparatus.
Figure 2:
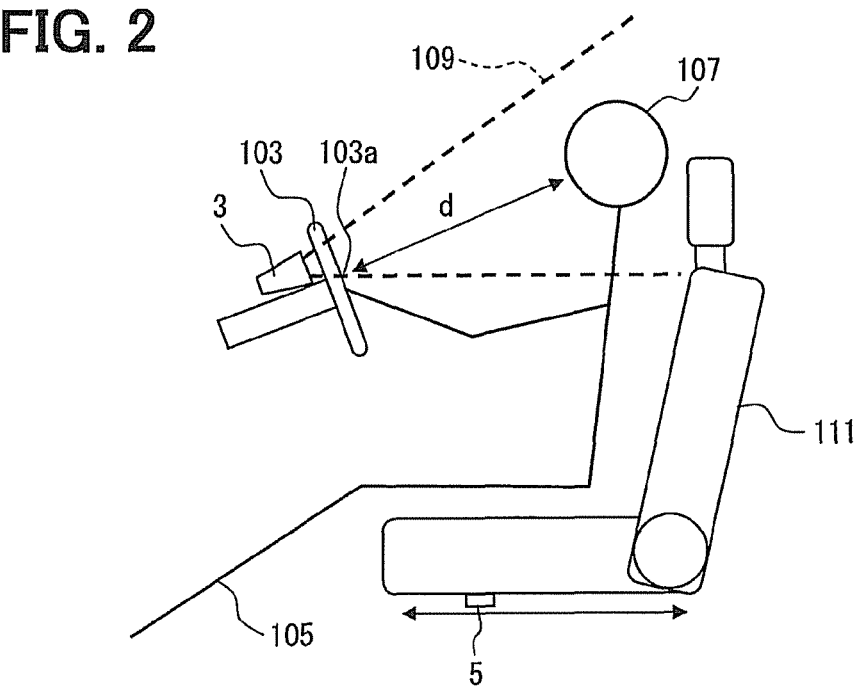
FIG. 2 is a diagram for explaining an arrangement of parts of the vehicular collision safety control apparatus in the vehicle.
Figure 8:
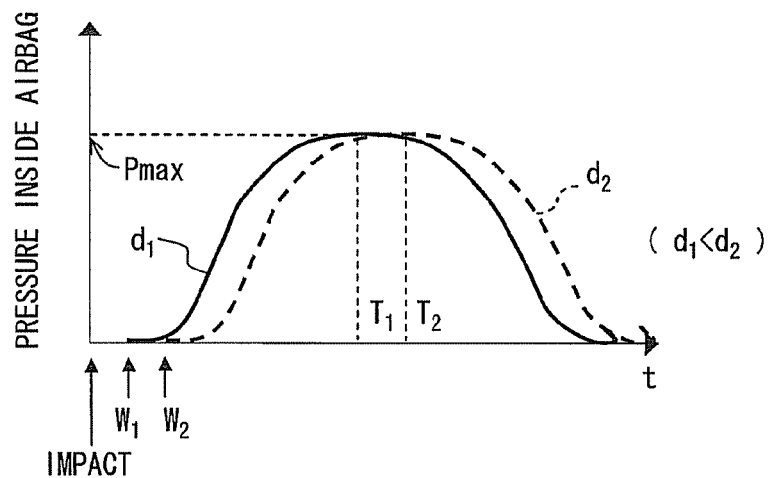
FIG. 8 is a diagram illustrating a change in pressure inside an airbag.

A configuration of a vehicular collision safety control apparatus 1 will be described with reference to FIGS. 1, 2 and 8. FIG. 1 is a block diagram illustrating the configuration of the vehicular collision safety control apparatus 1. FIG. 2 is a diagram for explaining an arrangement of parts of the vehicular collision safety control apparatus 1 in the vehicle. FIG. 8 is a diagram illustrating a change in pressure inside an airbag 101.

The vehicular collision safety control apparatus 1 is an in-vehicle apparatus mounted in a vehicle and has a function to control pressure inside the airbag 101. The vehicular collision safety control apparatus 1 includes an image acquisition device 3, a seat position detection device 5, an image processing device 7, and an airbag pressure control device 9. The image acquisition device 3 can correspond to an example of image acquisition device and means. The seat position detection device 5 can correspond to an example of seat position acquisition device and means. The image processing device 7 can correspond to an example of face position acquisition device and means, and an example of face position change detection device and means. The airbag pressure control device 9 can correspond to an example of airbag activation device and means, an example of a distance calculation device and means, and an example of setting device and means.

The image acquisition device 3 includes a camera 11 and a projector 13. As shown in FIG. 2, the image acquisition device 3 is arranged on a rear side of a steering wheel 103 of the vehicle. In other words, the image acquisition device 3 is arranged on an opposite side of the steering wheel 103 from the face 107 of the driver 105. The camera 11 includes CCD, CMOS or the like. The camera 11 can take an image of a coverage area covering the face 107 of the driver 105. The camera 11 outputs an image signal of the image to the image processing device 7. The projector 13 irradiates the face 107 of the driver 105 with light.

The seat position detection device 5 detects position of a driver seat 111 and outputs a detection result as seat position information to the airbag pressure control device 9. Note that the position of a driver seat 111 is adjustable in a front-to-rear direction of the vehicle (corresponding to a left-to-right direction in FIG. 2).

The image processing device 7 and the airbag pressure control device 9 perform the below-described processing by using the image signal inputted from the camera 11 and the seat position information inputted from the seat position detection device 5. When an impact on the vehicle is detected, the airbag pressure control device 9 controls the pressure inside the airbag 101, as shown in FIG. 8. Specifically, after detection of the impact, the pressure inside the airbag 101 is controlled such that the pressure first increases with time and reaches its maximum pressure after a while, and thereafter decreases with time.

As shown in FIG. 2, a center of a surface of the steering wheel 103 opposing the face 107 of the driver 105 is designated as a reference position 103a.

2. Processing Performed by Vehicular Collision Safety Control Apparatus

Figure 3:
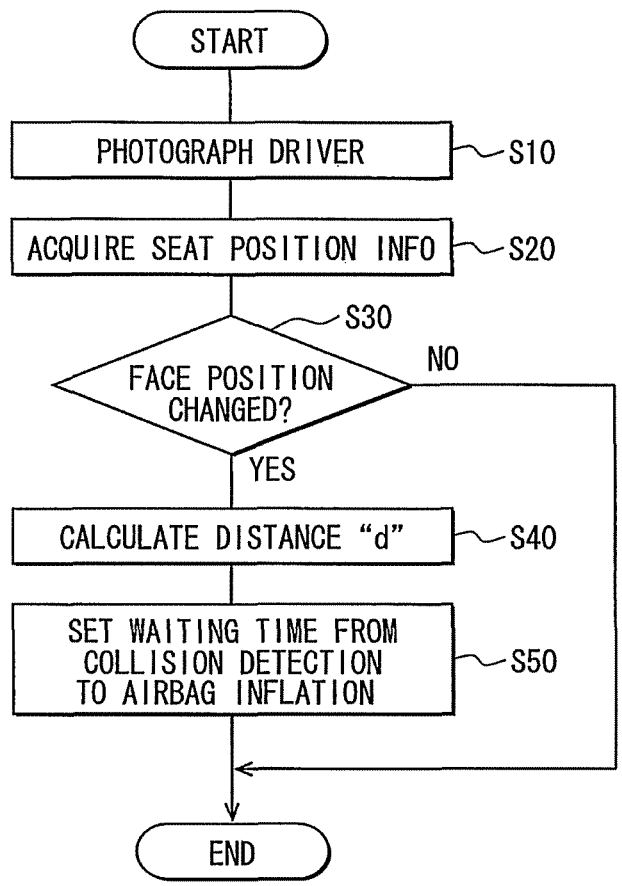
FIG. 3 is a flowchart illustrating processing which the vehicular collision safety control apparatus repeatedly performs at predetermined time intervals.
Figure 4:
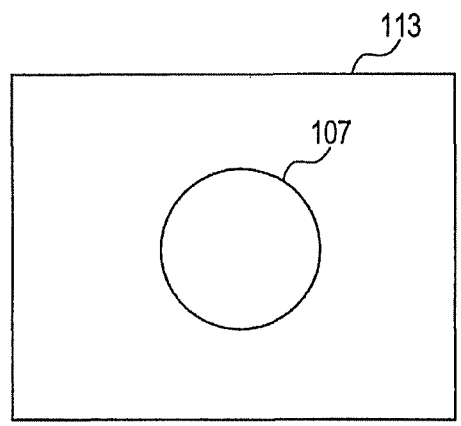
FIG. 4 is a diagram for explaining an image taken with a camera.

Processing performed by the vehicular collision safety control apparatus 1 will be described with reference to FIGS. 3 to 7 in addition to FIGS. 1, 2 and 8. FIG. 3 is a flowchart illustrating the processing which the vehicular collision safety control apparatus 1 repeatedly performs at predetermined time intervals. FIG. 4 is a diagram for explaining an image taken with the camera 11. FIG. 5 is a diagram illustrating a relation between a time span during which the camera 11 takes images and frame numbers. FIG. 6 is a diagram illustrating how to calculate a face center position C in the image. FIG. 7 is a diagram illustrating how to determine whether or not there is a change in the position of the face.

At S10, the camera 11 takes 3N images during a time span $3\Delta t$, where N is a natural number greater than or equal to 1. In the above, the camera 11 takes an image at constant time intervals. As shown in FIG. 4, each image 113 contains the face 107 of the driver 105. To respective 3N images, numbers indicative of an order of taking images $F_1, F_2, F_3 \ldots F_{3N}$ are assigned. This number is called herein a frame number. As shown in FIG. 5, the frame numbers of images taken during a time span from $t_0$ to $t_0+\Delta t$ are $F_1, F_2, F_3 \ldots F_N$. The frame numbers of images taken during a time span from $t_0+\Delta t$ to $t_0+2\Delta t$ are $F_{N+1}, F_{N+2}, F_{N+3} \ldots F_{2N}$. The frame numbers of images taken during a time span from $t_0+2\Delta t$ to $t_0+3\Delta t$ are $F_{2N+1}, F_{2N+2}, F_{2N+3} \ldots F_{3N}$. Image signals of all of the images 113 are outputted to the image processing device 7.

At S20, the seat position detection device 5 detects the position of the seat 111 in the front-to-rear direction and outputs the seat position information to the airbag pressure control device 9.

At S30, the image processing device 7 determines whether or not the face center position (i.e., position C of the center of the face 107) is changed, in the following way. First, for all of the images acquired at S10, the image processing device 7 calculates the face center position C. Specifically, as shown in FIG. 6, the image processing device 7 draws a horizontal line $L_1$ passing through an upper end of the face 107 in the image 113, a horizontal line $L_2$ passing through a lower end of the face 107, a vertical line $L_3$ passing through a right end of the face 107, and a vertical line $L_4$ passing through a left end of the face 107. Further, the image processing device 7 draws a diagonal line $L_5$ passing through a point of intersection between $L_1$ and $L_3$ and a point of intersection between $L_2$ and $L_4$, and a diagonal line $L_6$ passing through a point of intersection between $L_1$ and $L_4$ and a point of intersection between $L_2$ and $L_3$. The image processing device 7 designates a point of intersection between $L_5$ and $L_6$ as the center position C. It should be noted that in FIG. 6, the x-direction is the horizontal direction and the y-direction is the vertical direction.

Then, an average of the center positions of the images 113 with the frame numbers $F_1, F_2, F_3 \ldots F_N$ is calculated to be an average center position $C_1$. Further, an average of the center positions of the images 113 with the frame numbers $F_{N+1}, F_{N+2}, F_{N+3} \ldots F_{2N}$ is calculated to be an average center position $C_2$. Further, an average of the center positions of the images 113 with the frame numbers $F_{2N+1}, F_{2N+2}, F_{2N+3} \ldots F_{3N}$ is calculated to be an average center position $C_3$. FIG. 7 shows an example of distribution of the average center positions $C_1, C_2, C_3$. Note that $C_p$ refers to the center position of the face 107 when the distance "d" was calculated most recently.

Next, it is determined whether or not all of the following expressions (1) to (4) are satisfied.

$$D(C_1-C_p)>TH1 \tag{1}$$

$$D(C_2-C_p)>TH1 \tag{2}$$

$$D(C_3-C_p)>TH1 \tag{3}$$

$$D_{max}(C_1,C_2,C_3)<TH2 \tag{4}$$

where $D(C_1-C_p)$ denotes a distance between $C_1$ and $C_p$ on the image 113, $D(C_2-C_p)$ denotes a distance between $C_2$ and $C_p$ on the image 113, $D(C_3-C_p)$ denotes a distance between $C_3$ and $C_p$ on the image 113. Additionally, $D_{max}(C_1,C_2,C_3)$ denotes a largest one among the distance between $C_1$ and $C_2$, a distance between $C_2$ and $C_3$ and a distance between $C_3$ and $C_1$. TH1 and TH2 denote preset thresholds (fixed values).

The satisfaction of the expressions (1) to (3) means that the distance between the center position $C_p$ of the face when the distance "d" was calculated the previous time and each average center position $C_1, C_2, C_3$ is large. That is, the satisfaction of the expressions (1) to (3) means that there is a change in position of the face 107. Additionally, the satisfaction of the expression (4) means that a dispersion of the face center positions in the images with the frame numbers $F_1, F_2, F_3 \ldots F_{3N}$ is small.

When all of the expressions (1) to (4) are satisfied, the processing proceeds to S40. When at least one of the expressions (1) to (4) is not satisfied, this processing is ended. At S40, the image processing device 7 outputs the average center position $C_3$ as a center position of the face in the plane of the image 113 to the airbag pressure control device 9. It should be noted that this $C_3$ is used as $C_p$ when S30 is preformed next time.

The airbag pressure control device 9 acquires a center position of the face 107 in a three-dimensional space based on the center position C3 of the face 107 inputted from the image processing device 7 and the position of the seat 111 in the front-to-rear direction acquired at S20. In the above, the three-dimensional space refers to a space constructed by a planer direction (two dimensional) of the image 113 and the front-to-rear direction (one directional) of the vehicle. The airbag pressure control device 9 is provided with a prepared map for outputting the center position of the face 107 in the three-dimensional space in response to input (receipt) of the center position of the face 107 in the plane of the image 113 and the position of the seat 111 in the front-to-rear direction. The airbag pressure control device 9 calculates the distance "d" between the center position of the face 107 in the three-dimensional space and the reference position 103a of the steering wheel 103. In this relation, the airbag pressure control device 9 is provided with a prepared map for outputting the distance "d" in response to input (receipt) of the center position of the face 107 in the three-dimensional space and the reference position 103a of the steering wheel 103.

At S50, the airbag pressure control device 9 sets a waiting time from the detection of the impact to the inflation of the airbag 101, so that the smaller the distance "d" is, the smaller a pressure-reach time T is. Here, the pressure-reach time T is a time from when the impact on the vehicle is detected to when the pressure inside the airbag 101 reaches the maximum pressure. The waiting time is also called herein a pressure increase start delay time W of the airbag 101.

The map for outputting the center position of the face 107 in the three-dimensional space can be generated by associating the center position of the face 107 in the three-dimensional space with the center position of the face 107 in the plane of the image 113 and the position of the seat in the front-to-rear direction of this moment while changing the center position of the face 107 in the plane of the image 113 and the position of the seat in the front-to-rear direction. In the map for outputting the distance "d", the reference position 103a in three-dimensional space is registered and the same coordinate system as in the map for outputting the center position of the face 107 is used. Therefore, it is possible to easy to obtain the distance "d".

More specifically, as shown in FIG. 8, in the case of an occurrence of the impact on the vehicle, although the pressure inside the airbag 101 first increases with time, reaches the maximum pressure $P_{max}$ and then decreases with time, the pressure-reach time T for the pressure inside the airbag 101 to reach the maximum pressure is set such that the smaller the distance "d" is, the smaller the pressure-reach time T is. The pressure-reach time T can be changed by adjusting a pressure increase start delay time W of the airbag 101 in accordance with the distance "d", (see FIG. 8).

In the cases of $d=d_1$ and $d=d_2>d_1$ as illustrated in FIG. 8, $W_1$ is less than $W_2$ ($W_1<W_2$) and $T_1$ is less than $T_2$ ($T_1<T_2$) where $W_1$ is the delay time W in the case of "$d_1$", $W_2$ is the delay time W in the case of "$d_2$", $T_1$ is the pressure-reach time T in the case of "$d_1$", and $T_2$ is the pressure-reach time T in the case of "$d_2$".

Figure 9:
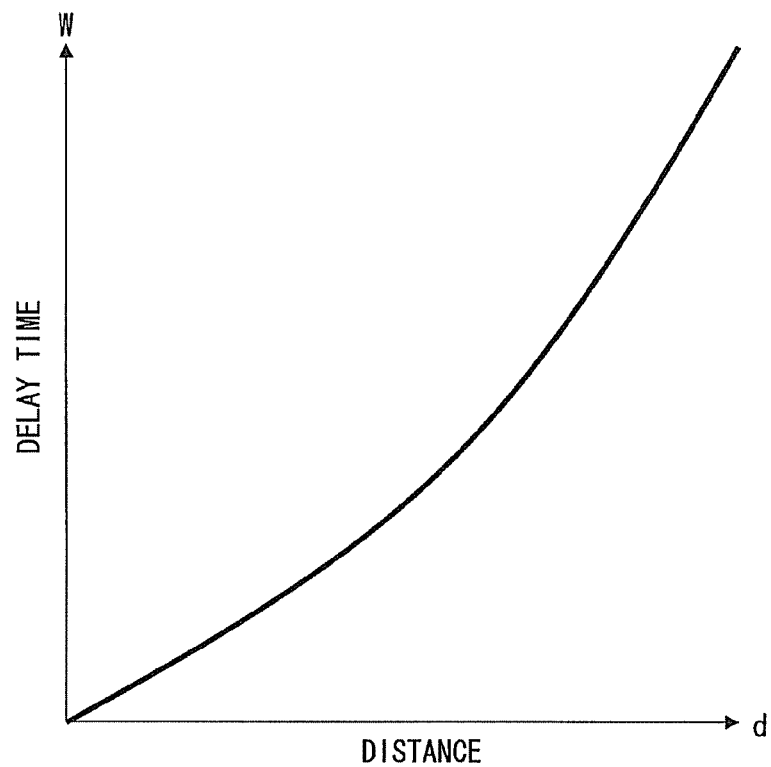
FIG. 9 is a diagram illustrating a relation between an airbag pressure increase start delay time "W" and a distance "d".

FIG. 9 illustrates a relation between the pressure increase start delay time "W" of the airbag 101 and the distance "d". Based on the exponential relation as illustrated in FIG. 9, the delay time "W" is obtained from the distance "d" and reflected in a control value of the airbag pressure control device 9.

3. Technical Effect of Vehicular Collision Safety Control Apparatus

The vehicular collision safety control apparatus 1 sets the pressure-reach time T, which is a time for the pressure inside the airbag 101 reaches the maximum pressure $P_{max}$ after the detection of the impact, to a smaller value as the distance "d" is smaller. Therefore, when the distance "d" is small, the collision of the face 107 of the driver 105 with the steering wheel 103 before the inflation of the airbag 101 can be prevented.

Moreover, since the longer pressure-reach time T is set when the distance "d" is large, the collision of the face 107 of the driver 105 with the steering wheel 10 because of the reduced pressure inside the airbag 101 is prevented.

The vehicular collision safety control apparatus 1 refines the pressure-reach time T subject to the change in center position of the face 107 in the three-dimensional space (YES at S30). Thus, as long as the center position of the face 107 in the three-dimensional space is not changed, the vehicular collision safety control apparatus 1 does not refine the time T. Therefore, it is possible to simplify the processing performed by the vehicular collision safety control apparatus 1.

Embodiments are not limited to the above-illustrated embodiment and can have various forms within the sprit and scope of the present disclosure. For example, the vehicular collision safety control apparatus 1 is also applicable to an airbag for an occupant other than the driver.

Moreover, although the images 113 are divided into three groups at the above-described S10, the number of groups is not limited to three and may be an arbitrarily plural number (e.g., 2, 4, 5, 6 and so on).

Moreover, at S30, a particular part of the face (e.g., nose, eye, mouth etc.) may be used as the face center position. Such a particular part of the face can be detected with well-known image recognition techniques.

Moreover, at S40, an average of the face center positions in all of the images (i.e., the images with the frame numbers $F_1$, $F_2$, $F_3$ may be outputted as the center position of the face in the plane of the image 113 to the airbag pressure control device 9.

Moreover, the center position of the face 107 in the three-dimensional space may be obtained without using the position of the seat 111 in the front-to-rear direction. In this configuration, the position of the face 107 in the front-to-rear direction of the vehicle can be detected from, for example, a distance between the particular parts of the face 107 (e.g., a distance between eyes, a distance between eyebrows, a distance between ears etc.). For example, as the distance between eyes is smaller, the position of the face 107 in the front-to-rear direction is located frontward. As the distance between eyes is smaller, the position of the face 107 in the front-to-rear direction is located rearward.

According to the present disclosure, a collision safety control apparatus for a vehicle can be provided in various forms. For example a collision safety control apparatus for a vehicle may include an image acquisition device, a face position acquisition device, a distance calculation device, an airbag activation device and a setting device. The image acquisition device acquires an image in which a face of an occupant of the vehicle is photographed. Based on this acquired image, the face position acquisition device acquires a position of the face of the occupant in a three-dimensional space. The distance calculation device calculates a distance (d) between the acquired position of the face of the occupant in the three-dimensional space and a reference position located on a front side of the face of the occupant. The setting device sets a waiting time (W) from the detection of the impact to start of inflation of an airbag in accordance with the calculated distance (d), so that as the calculated distance (d) is smaller, a pressure-reach time (T) is smaller, wherein the pressure-reach time (T) is a time from when an impact on the vehicle is detected to when pressure inside the airbag reaches the predetermined pressure. If the impact on the vehicle is detected, the airbag activation device generates gas in the airbag and increases the pressure inside the airbag to the predetermined pressure by, for example, exploding a squib upon the elapse of the waiting time after the detection of the impact.

According to the above collision safety control apparatus, the smaller the distance (d) is, the smaller pressure-reach time (T) is set. Therefore, for example, even when the distance "d" is small, the collision of the occupant's face with the steering wheel before the inflation of the airbag can be prevented.

Furthermore, the larger the distance (d) is, the larger pressure-reach time (T) is set. Therefore, the pressure inside the airbag does not fall below a supposed pressure a time when the occupant's face collides with the steering wheel.

It may be preferable that: the above collision safety control apparatus further include a seat position detection device for detecting a position of a seat on which the occupant is seated; and the face position acquisition device acquire the position of the face of the occupant in the three-dimensional space based on a position of the face of the occupant in a plane of the image and the position of the seat. According to this configuration, it is possible to facilitate acquiring the position of the face of the occupant in the three-dimensional space.

It may be preferable that: the above collision safety control apparatus further include a position change detection device for detecting a change in the position of the face of the occupant in the three-dimensional space; and the setting device refine the waiting time (W) subject to detection of the change in the position of the face of the occupant in the three-dimensional space. According to this configuration, as long as the position of the face of the occupant in the three-dimensional space is not changed, the waiting time (W) is not refined. Therefore, it is possible to simplify processing performed by the collision safety control apparatus.

The above described reference position can be an arbitrary position in the vehicle located in front of the face of the occupant. For example, the reference position may be a point on the steering wheel.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A collision safety control apparatus for a vehicle, comprising:
    an image acquisition device configured to acquire an image in which a face of an occupant of the vehicle is photographed;
    a face position acquisition device configured to acquire a position of the face of the occupant in a three-dimensional space based on the acquired image;
    a distance calculation device configured to calculate a distance (d) between the acquired position of the face of the occupant in the three-dimensional space and a reference position located in front of the face of the occupant;
    an airbag activation device configured to increase pressure inside an airbag to a predetermined pressure in response to detection of an impact on the vehicle; and
    a setting device configured to set a waiting time (W) from the detection of the impact to start of inflation of the airbag in accordance with the calculated distance (d), so that as the calculated distance (d) is smaller, a pressure-reach time (T) is smaller, wherein the pressure-reach time (T) is a time from when the impact is detected to when the pressure inside the airbag reaches the predetermined pressure.

2. The collision safety control apparatus according to claim 1, further comprising:
    a seat position detection device configured to detect a position of a seat on which the occupant is seated, wherein:
    the face position acquisition device acquires the position of the face of the occupant in the three-dimensional space based on a position of the face of the occupant in a plane of the image and the position of the seat.

3. The collision safety control apparatus according to claim 1, further comprising:
    a position change detection device configured to detect a change in the position of the face of the occupant in the three-dimensional space, wherein:
    the setting device refines the waiting time (W) subject to detection of the change in the position of the face of the occupant in the three-dimensional space.

4. A collision safety control method for a vehicle comprising:
    acquiring an image in which a face of an occupant of the vehicle is photographed;
    acquiring a position of the face of the occupant in a three-dimensional space based on the acquired image;
    calculating a distance (d) between the acquired position of the face of the occupant in the three-dimensional space and a reference position located on a front side of the face of the occupant; and
    setting a waiting time (W) from detection of an impact on the vehicle to start of inflation of an airbag in accordance with the calculated distance (d), so that as the calculated distance (d) is smaller, a pressure-reach time (T) is smaller, wherein the pressure-reach time (T) is a time from when the impact is detected to when pressure inside the airbag reaches a predetermined pressure.

5. The collision safety control method according to claim 4, further comprising:
    detecting a position of a seat on which the occupant is seated,
    wherein:
    based on a position of the face in a plane of the image and the position of the seat, the position of the face in the three-dimensional space is acquired.

6. The collision safety control method according to claim 4, further comprising:
    detecting a change in the position of the face in the three-dimensional space, wherein:
    the waiting time (W) is refined subject to detection of the change in the position of the face in the three-dimensional space.

* * * * *